Nov. 29, 1966 F. ČURN 3,288,580
METHOD OF PREPARING A DIAMOND TOOL
Filed March 31, 1965 2 Sheets-Sheet 1

INVENTOR.
František Čurn

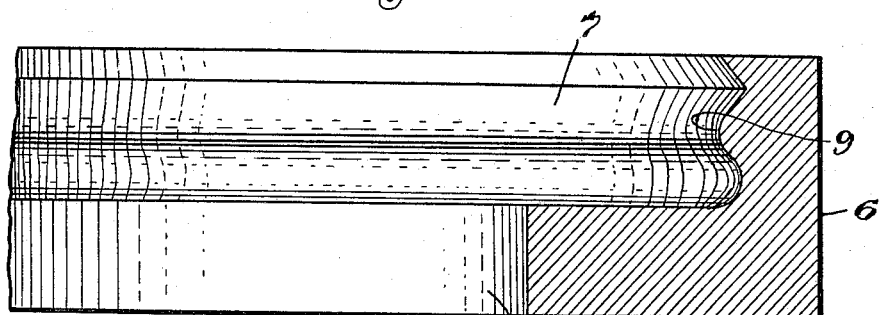
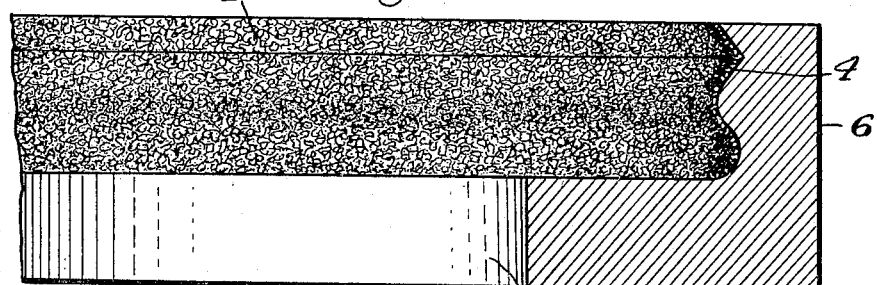
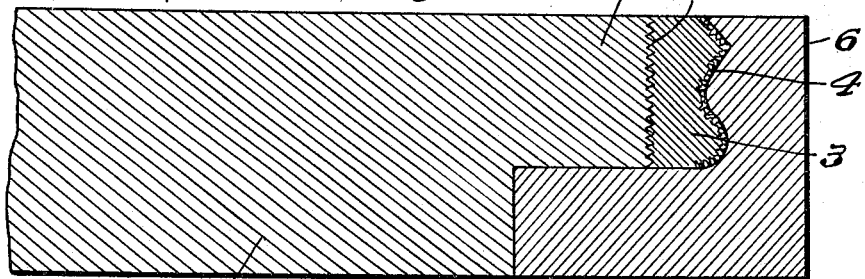
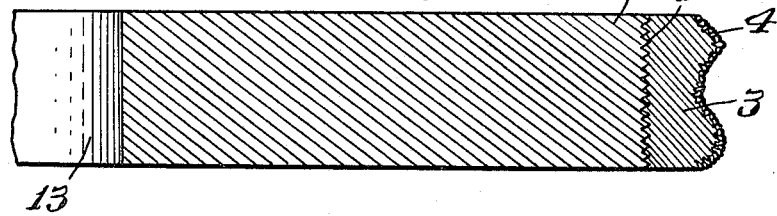

3,288,580
METHOD OF PREPARING A DIAMOND TOOL
František Čurn, Prague, Czechoslovakia, assignor to Naradi, Narodni Podnik, Prague, Czechoslovakia
Filed Mar. 31, 1965, Ser. No. 445,863
Claims priority, application Czechoslovakia, May 13, 1963, PV 2,704/63
12 Claims. (Cl. 51—309)

This application is a continuation-in-part of my copending application Serial Number 364,239, filed May 1, 1964 and now abandoned.

This invention relates to a method of preparing diamond tools.

Diamond grinding wheels are conventionally employed for shaping very hard materials, such as sintered carbides. The usual diamond grinding wheel has a narrow edge portion which is held substantially in point contact with the object to be shaped and is moved over the surface of the object for working each point of the surface. The movements of the grinding wheel are guided by a copying attachment in which a pattern of the desired surface is sensed by a stylus, or by an electronic or other equivalent of such an attachment.

The working edge of most conventional diamond grinding wheels consists of a binder matrix in which diamond grains are embedded. The dimensions of the wheel and its shape change as the diamond grains are worn down and torn from the binder. The shape of the working edge can be restored only by removing a layer of binder with the diamonds embedded therein, and diamonds which never performed their grinding function are lost during restoration of the wheel shape.

The known diamond grinding wheels are limited in their application to relatively simple shapes, and they work slowly since they are in contact with a work piece substantially in one point only. The limitations of the available diamond tools have heretofore made it impractical to use sintered carbides in many dies or similar applications for which they would be suitable otherwise.

The shortcomings of conventional diamond grinding wheels are also inherent in hand files which employ diamond grains as a cutting medium and are prepared in an analogous manner.

The working surface of a conventional diamond tool, in which diamond grains are embedded in a binder matrix, is occupied to a significant part by the binder which does not produce a significant cutting effect.

Attempts were made heretofore to avoid the shortcomings of the afore-described abrasive compositions by a carrier with a single layer of diamond grains. Diamond grains, however, are normally of different shapes and sizes, but even if all grains in the single layer are of identical shape and size, and they never are, their cutting points are normally not in a common plane. The grain of the known single-layer diamond tools are more or less randomly oriented, and not all diamond grains make contact with a workpiece until the points of the farthest projecting grains are worn away. It is evident that very close dimensional tolerances cannot be maintained with such a tool.

It is an object of the invention to provide a simple and inexpensive method of producing diamond tools.

With this and other objects in view, as will hereinafter become apparent, the method of my invention aims at a tool in which a single layer of closely packed diamond grains is partly embedded in a face of a carrier, from which the diamond grains partly project. The cutting points of the projecting portions of the grains are directed outwardly from said layer and constitute the desired common working surface which is defined by a single set of parallel lines.

If the tool is a grinding wheel, the common surface of the cutting points presents circular cross sections, and forms an annulus, about the axis of the grinding wheel. Most diamond grains of the layer are in abutting contact with at least one other grain of the layer. The grains are embedded in the carrier face to different depths.

In making the afore-described tool, a mold surface is coated with a layer of adhesive. A body of loose diamond grains in an amount much greater than needed for covering the mold surface with a single packed layer of grains is deposited on the coated mold surface. The grain size of the diamonds should be greater than the thickness of the adhesive coating. The loose diamond grains are tumbled, while in contact with the coated surface, until a substantially continuous layer of diamond grains is retained by the adhesive. Portions of the retained grains project from the adhesive. The projecting portions are referred to hereinafter as bottom portions.

The excess of loose diamond grains, not retained by the adhesive, is then removed, and the bottom portions of the retained grains are embedded in a backing material while the latter is at least partly liquid. Upon solidification of the backing material, the solidified material and the retained grains partly embedded therein are removed from the mold surface.

Other features and many of the attendant advantages of this invention will be readily appreciated as the invention becomes better understood from the following detailed specification, when considered with the annexed drawings in which:

FIG. 3 illustrates a mold, in a fragmentary axial section, for making the wheel of FIG. 1;

FIGS. 4 and 5 illustrate the making of a diamond grinding wheel by means of the mold of FIG. 3; and FIG. 6 shows the finished wheel on a smaller scale than that employed in FIG. 1.

Figure 1:
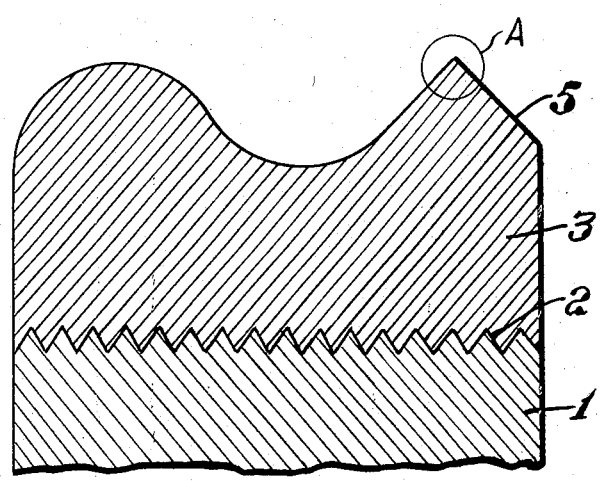
FIG. 1 shows the working portion of a diamond grinding wheel in axial section, made according to the method of the present invention.

Referring now to the drawing in detail, and initially to FIG. 1, there is seen a working portion of a grinding wheel having a partly seen central carrier portion 1 which is a generally circular metal disc whose circumference 2 is knurled for conforming engagement with a backing 3. The outer face 5 of the backing 3 has an annular shape and is contoured corresponding to the shape that it is intended to produce in the workpiece.

Figure 2:
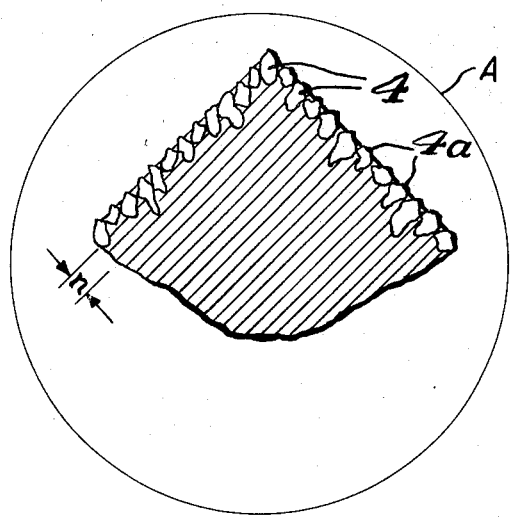
FIG. 2 shows a detail of the wheel of FIG. 1 on a greatly enlarged scale.

A portion of the backing member 3 indicated by a circle A in FIG. 1 is shown in FIG. 2 on a much larger scale. Its outer surface is studded with diamond grains 4 the cutting edges of all of which are mostly elongated transversely to the surface. Points 4a of the grains project from the surface and are precisely aligned in an imaginary surface parallel to and coaxial with the circumferential surface 5 of the backing 3. It is inherent in this arrangement that all points 4a which lie in a common radial plane with respect to the wheel axis are precisely equidistant from that axis. The bonding material of the backing 3, between the carrier portion 1 and the surface 5 of the backing, is free from embedded diamonds. The surface layer of the grains 4 is so closely packed that each grain touches at least one laterally adjacent grain.

The diamond grains 4 vary somewhat in their length. A layer of a thickness n somewhat beneath the surface 5 (see FIG. 2) is, therefore, partly occupied by diamond grains 4. The grains form an irregular pattern, due to the different dimensions of the grain bottom portions extending into the bonding material, not relevant to the working properties of the tool illustrated.

When the wheel partly shown in FIG. 1 is rotated about its axis, and a workpiece is radially urged against the wheel, a recess conforming to the shape of the surface 5 is ground into the workpiece. Since all diamond grains 4 make simultaneous contact with the surface of the workpiece the grinding pressure and other stresses are uniformly distributed over all grains 4. They wear relatively slowly, and individual grains are not dislodged from the backing 3 until the wheel reaches the end of its useful life by abrasion of all points 4a. The relatively large contact area between wheel and workpiece sharply reduces the time required for removal of workpiece material as compared with a conventional wheel in which diamond grains are distributed in the binder matrix in three dimensions.

The manner in which the diamond grinding wheel of FIG. 1 is prepared is illustrated in FIGS. 3 to 6. A mold 6 is made first. As shown in FIG. 3, the mold 6 has a cavity 7 of circular cross section which conforms to the diamond wheel that is to be made. The circumferential wall 9 of the cavity 7 is a replica of the shape in which the layer of diamond grains 4 is to be deposited on the finished wheel. The mold 6, furthermore, has a wide cylindrical locating bore 8 which is contiguously coaxial with the cavity 7.

The mold 6 is preferably machined from an inexpensive wrought aluminum alloy containing copper and magnesium as primary alloying elements together with minor amounts of iron, nickel, and titanium. A forming tool of high-speed steel having a rake angle of 0° may be employed for shaping the critical countour of the wall 9 on an accurate toolmaker's lathe. The tool may be used over and over again in the relatively soft aluminum alloy. As is evident from FIG. 3, the aluminum alloy blank from which the mold 6 is made has about twice the axial thickness of the wheel to be prepared.

The diameter of the locating bore 8 should be about four fifths of the diameter of the cavity 7, but this relationship is not critical as will be readily apparent.

An insert 10 of generally stepped cylindrical shape is prepared next. As seen in FIG. 5, the insert has a portion 11 which precisely fits the bore 8 and constitutes a broad locating pin, and another portion 12 whose axial height is equal to that of the cavity 7 and whose diameter is approximately 5 to 10% smaller than that of the cavity. The insert 10 is made of the same aluminum alloy as the mold 6 by turning on a precision lathe. The outer curved face of the portion 12 is knurled.

When proper fit of the insert 10 in the mold 6 is established, the insert is withdrawn, and both the mold and the insert are carefully degreased. The mold, moreover, is immersed in dilute, lukewarm sodium hydroxide solution for 60 seconds while in an inverted position so as to etch the circumferential wall 9 of the cavity 7 without etching the locating bore 8, rinsed in water, and dried.

A thin but continuous layer of adhesive is next applied to the circumferential cavity wall 9 by brushing or spraying the same carefully with an adhesive solution, such as an aqueous 5 percent solution of gum arabic. The layer should not be more than a few microns thick and is not visible on the scale of the drawing.

The mold 6 is then tilted until the axis of the cavity 7 is approximately horizontal, and diamond powder of the desired grain size is heaped on the lowermost portion of the circumferential cavity wall 9 while the adhesive is still moist. It is essential that the amount of diamond powder applied be much larger than that required for covering the diamond grinding wheel to be prepared. For example, if the wheel will eventually carry 7 carats of diamonds, the amount of powder supplied should be 35 carats. The mold 6 is slowly turned once about its axis. This can be done simply by hand or while holding the mold in a suitable support. The entire, adhesive-coated cavity wall 9 thus is contacted with diamond powder. The weight of the excess powder forces the bottom layer of diamond grains into and through the adhesive into abutting engagement with the wall 9 of the mold 6.

The individual grains are driven through the adhesive layer in the direction of their cutting edges and come to rest against the wall 9 of the mold 6 with their terminal points abutting against the wall. This readily observed fact is believed due to the pressure of other grains, which acts from all directions except from the direction of the wall. The rotation of the mold 6 produces a tumbling action in which the diamond grains align themselves to move longitudinally as they slide downward along the surface of the tumbling body of diamond grains, and similar alignment appears to take place within the tumbling body.

The loose diamond grains continue tumbling as the mold is further rotated, but a layer of diamond grains is held in the thin adhesive layer whose thickness must not be more than a fraction of the average length of the diamond grains. The retained grains are densely packed, making abutting contact with at least one adjacent grain, and the direction of the axes of their cutting edges is more or less perpendicular to the mold wall 9.

The speed at which the mold is being rotated must be high enough to produce the afore-described tumbling action. At lower speeds, the entire body of diamond grains may slide as a unit along the mold wall, and the desired result is not achieved. The necessary speed of rotation can readily be determined by inspection in any particular case and varies with specific conditions. The size of the diamond grains is the most important variable in this respect. With diamond grains of 120 to 150 mesh, the mold should be rotated about its axis once in 20 to 30 seconds, and not more.

The excess diamonds which are not retained by the adhesive are then poured out, and the coated mold is permitted to stand in air for about 5 to 15 minutes, thereby permitting the adhesive to set fully. The mold is then set up, as shown in FIG. 4, the insert 10 is placed in the mold, and the annular space between the insert portion 12 and the diamond layer on the axial mold wall 9 in the cavity 7 is filled with a binder material.

It is preferred to use a mixture of higher melting metal particles and a low melting alloy as a binder. Aluminum alloy chips produced in machining the mold 6 and the insert 10 may be comminuted and screened, and the fraction passing through a 0.22 mm. screen but retained on a 0.22 mm. screen may be mixed with one half part by weight of coarse antimony powder having a particle size of 0.15 to 0.22 mm. The mixture is loosely packed in the annular mold space. The small solid metal particles are then bonded to each other, to the insert 12, and to the diamond grains 4 on the mold wall 9 by a low melting alloy which is preferably applied under pressure to avoid air pockets. The mold 6, insert 10, the loose powder in the annular mold space, and the diamond grains on the mold wall are preferably inserted in a conforming die-casting mold, and the low melting alloy is injected into the annular space in a manner conventional in diecasting.

A preferred casting alloy consists of 65 percent of a conventional zinc diecasting alloy containing copper and aluminum as the principal alloying elements, about 32 percent cadmium, and about 3 percent of a commercial silver solder, mainly consisting of silver, copper, zinc, and cadmium, but other alloys having a lower melting point than the aluminum alloy and the antimony powder may be employed.

The mixture of aluminum chips and antimony powder prevents the diamond grains from being displaced by the impact of a stream of molten metal. It also strengthens the cast alloy after solidification. The powder may be omitted entirely in small grinding wheels and gravity casting may be resorted to.

After solidification of the cast material and removal of sprues and gates, there is obtained the structure shown in FIG. 5 in which the annular gap between the diamond grains and the knurled surface of the insert 10 is filled by the backing 3 of metal which conformingly envelops the bottom portions of the grains 4 which project from the adhesive layer in a radially inward direction.

Next, the mold 6 is removed from the partially finished wheel. The bulk of the mold is cut away on a lathe, some of the remainder may be ground off, and the thin remaining shell may be stripped from the layer of diamond grains 4 which are firmly embedded in the backing 3. Such stripping is greatly facilitated by the preliminary etching of the mold 6 in sodium hydroxide solution.

The locating pin 11 is machined away from the remainder of the insert 10, thereby leaving the central wheel portion 1 which is then axially bored to provide a chucking hole 13. The radial faces of the wheel may be further finished, and the adhesive may be removed, if so desired, by wet cleaning with or without pumice.

The point 4a of each grain 4 thus projects from the surface 5 of the backing 3 over a distance which corresponds to the thickness of the initial adhesive layer. All points 4a lie in a common surface parallel to the surface 5.

If a flat surface or any other surface that is not of circular cross section, for instance, surfaces of block-type dressers, hand files, is to be coated with a layer of diamonds according to this invention, a mold with a corresponding flat or other surface defined by a simple set of parallel lines is coated with adhesive, and a large excess of diamonds is heaped on the adhesive coating. The afore-described tumbling action then is produced by rocking the mold until a dense layer of aligned diamond grains is partly embedded in the adhesive layer. The diamond layer if then backed with a binder, such as a low-melting alloy, in a manner evident from the more detailed description of the making of a grinding wheel. All points of the diamond grains lie in the afore-mentioned plane when the tool is finished and are therefore capable of area contact with a workpiece during relative movement of tool and workpiece in the direction of the parallel lines which define the surface.

Obviously, the steps of supporting a layer of diamond grains, produced according to the invention, with a supporting material which also acts as a binder for the diamond grains may be carried out in different ways.

The annular space between the diamond grains and the insert 10 may be filled with an amalgam, such as bronze amalgam, which is put in position with a spatula. The radial forces to which such a grinding wheel may be subjected are, of course, limited by the strength of the amalgam.

A plastic backing is adequate for small grinding wheels, and the mold 6 described hereinabove may be used for casting a wheel of thermosetting synthetic resin under heat and pressure after the internal mold wall has been coated with diamond grains in the manner described. The product formed is a plastic wheel in the surface of which the diamond grains are embedded in the manner illustrated in FIG. 2.

The diamond tools made in accordance with the method of the invention permit a grinding technique commonly applied to steel to be extended to workpieces made of very hard and abrasive materials, such as sintered carbides, cermets, ferrites, corundum, and the like. The diamond tools are prepared in a simple manner and at low cost. The invention is not limited to the manufacture of grinding wheels, but is equally applicable to diamond-faced files, block-type and roller dressers, and other tools.

The tools produced according to the invention cannot be restored to operating condition after having been worn down, but their useful life is very long because of the uniform distribution of stresses among all diamond grains of the surface layer. The rate at which very hard materials may be ground away with the tools of the invention has never been achieved heretofore.

It should be understood, of course, that the foregoing disclosure relates only to preferred embodiments of the invention but is intended to cover all changes and modifications of the embodiments of the invention selected for the purpose of the disclosure, which do not constitute departure from the spirit and scope of the invention set forth in the appended claims.

I claim:
1. A method of making a diamond tool, which comprises
   (a) coating a mold surface with a layer of adhesive of predetermined thickness,
   (b) depositing on said surface a body of loose diamond grains in an amount substantially greater than the amount of diamond grains required for covering said surface with a single, closely packed layer of said grains,
      (1) the size of said grains being greater than said predetermined thickness,
   (c) tumbling said body while in contact with said surface until a substantially continuous layer of said grains is retained by said layer of adhesive, the bottom portions of the retained grains projecting from the adhesive,
   (d) removing the excess of loose grains not retained, and
   (e) embedding the projecting bottom portions of said retained grains in a backing material while the backing material is at least partly liquid,
   (f) solidifying the backing material, and
   (g) separating the solidified backing material and said retained grains partly embedded in the backing material from said mold surface.
2. A method as set forth in claim 1, wherein said adhesive is liquid activated and is in the activated condition during said depositing and said tumbling.
3. A method as set forth in claim 1, wherein said mold surface is defined by a single set of parallel lines.
4. A method as set forth in claim 1, wherein said mold is formed as the internal surface of a circular design and has a horizontal axis, and said body is tumbled by rotating the mold about said horizontal axis.
5. A method as set forth in claim 4, wherein the mold is rotated until a substantially continuous layer of said grains is retained, with all of said grains making abutting contact with at least one adjacent grain.
6. A method as set forth in claim 4, wherein elongated diamond grains are included in said body and are oriented by said tumbling step to be retained by said layer of adhesive to project inwardly from the surface of said mold in a substantially radial direction.
7. A method as set forth in claim 4, wherein said grains have terminal points, and the tumbling of said body causes said grains to be driven through said adhesive layer until said terminal points are in contact with said mold to effect precise alignment of said terminal points with the surface of said mold.
8. A method as set forth in claim 4, wherein said mold surface is machined in an aluminum alloy mold body containing copper and magnesium as the primary alloying elements, and said projecting bottom portions are embedded in a die cast alloy containing zinc, copper and aluminum as the principal alloying elements.
9. A method as set forth in claim 4, wherein said mold surface is formed in an aluminum mold, and the mold surface is etched with a dilute solution of sodium hydroxide before being coated with said layer of adhesive.
10. A method as set forth in claim 1, wherein said retained grains have projecting bottom portions, and said bottom portions are embedded in a die cast metal backing material.

11. A method as set forth in claim 1, wherein said mold surface after machining is etched prior to being coated with said layer of adhesive.

12. A method as set forth in claim 1, wherein said mold surface is formed in a plane, and the body of loose diamond grains is tumbled on said surface by rocking the mold to produce the desired dense layer of aligned diamond grains.

References Cited by the Examiner

UNITED STATES PATENTS

| | | | |
|---|---|---|---|
| 1,970,122 | 8/1934 | Beth | 51—293 |
| 2,800,753 | 7/1957 | Hollstrom | 51—206 |
| 2,978,846 | 4/1961 | Barron | 51—203 |
| 3,197,294 | 7/1965 | Adams | 51—293 |

ROBERT C. RIORDON, *Primary Examiner.*

L. S. SELMAN, *Assistant Examiner.*